(12) United States Patent
Wiley et al.

(10) Patent No.: US 8,800,531 B2
(45) Date of Patent: Aug. 12, 2014

(54) COMPRESSION BRAKE SYSTEM FOR AN ENGINE

(75) Inventors: Stephen M. Wiley, East Peoria, IL (US); John S. Pipis, Jr., Washington, IL (US)

(73) Assignee: Caterpillar Inc., Peoria, IL (US)

( * ) Notice: Subject to any disclaimer, the term of this patent is extended or adjusted under 35 U.S.C. 154(b) by 860 days.

(21) Appl. No.: 12/722,617

(22) Filed: Mar. 12, 2010

(65) Prior Publication Data

US 2011/0220061 A1 Sep. 15, 2011

(51) Int. Cl.
*F02D 13/04* (2006.01)

(52) U.S. Cl.
USPC ............................ 123/321; 123/90.15; 60/568

(58) Field of Classification Search
CPC ........... F01L 13/065; F01L 13/06; F01L 9/02; F01L 9/04; F01L 1/26; F01L 1/30; F01L 2041/001; F01L 2150/00; B60W 10/06; B60T 11/20; F15B 7/005
USPC .......... 123/90.11, 90.12, 90.15, 90.16, 90.23, 123/90.25, 319–322; 60/568
See application file for complete search history.

(56) References Cited

U.S. PATENT DOCUMENTS

| | | | |
|---|---|---|---|
| 4,384,558 A | 5/1983 | Johnson | |
| 5,495,838 A | 3/1996 | Johnson, Jr. | |
| 5,507,261 A * | 4/1996 | Johnson, Jr. | 123/322 |
| 5,890,469 A * | 4/1999 | Håkansson et al. | 123/321 |
| 6,125,828 A * | 10/2000 | Hu | 123/568.14 |
| 6,148,793 A | 11/2000 | Faletti et al. | |
| 6,253,730 B1 | 7/2001 | Gustafson | |
| 6,257,183 B1 * | 7/2001 | Vorih et al. | 123/90.12 |
| 6,257,213 B1 | 7/2001 | Maeda | |
| 6,325,043 B1 | 12/2001 | Meistrick et al. | |
| 6,354,265 B1 * | 3/2002 | Hampton et al. | 123/321 |
| 6,386,160 B1 * | 5/2002 | Meneely et al. | 123/90.16 |
| 6,394,067 B1 * | 5/2002 | Usko et al. | 123/321 |
| 6,415,752 B1 * | 7/2002 | Janak | 123/90.12 |
| 6,591,795 B2 * | 7/2003 | Janak | 123/90.12 |
| 6,601,563 B2 | 8/2003 | Funke et al. | |
| 6,647,954 B2 * | 11/2003 | Yang et al. | 123/321 |
| 6,691,674 B2 * | 2/2004 | McCarthy et al. | 123/321 |
| 6,701,888 B2 | 3/2004 | Houtz | |
| 6,718,940 B2 * | 4/2004 | Usko | 123/322 |
| 6,792,904 B2 * | 9/2004 | Håkansson et al. | 123/90.16 |
| 6,883,492 B2 * | 4/2005 | Vanderpoel et al. | 123/321 |
| 7,055,472 B2 * | 6/2006 | Robel et al. | 123/90.12 |
| RE39,258 E * | 9/2006 | Cosma et al. | 123/321 |
| 7,152,576 B2 | 12/2006 | Vanderpoel et al. | |
| 7,162,996 B2 * | 1/2007 | Yang | 123/321 |
| 7,201,121 B2 * | 4/2007 | Weber et al. | 123/90.12 |
| 7,484,483 B2 | 2/2009 | Yang et al. | |
| 7,963,259 B2 * | 6/2011 | Meldolesi et al. | 123/90.12 |
| 2004/0237932 A1 | 12/2004 | Persson | |

FOREIGN PATENT DOCUMENTS

EP 0747577 12/1996

* cited by examiner

*Primary Examiner* — John Kwon
*Assistant Examiner* — Johnny Hoang
(74) *Attorney, Agent, or Firm* — Miller, Matthias & Hull (57) ABSTRACT

A compression brake system of an internal combustion engine includes a mechanical system for coupling a camshaft to a brake actuator assembly. The mechanical system includes a stationary housing defining an aperture and a lifter is slidably disposed in the aperture. A resilient element is disposed between the housing and the shoulder and configured to bias the lifter toward the camshaft. The mechanical system is dedicated to compression braking, and therefore the camshaft may have a lobe optimized for braking.

14 Claims, 6 Drawing Sheets

COMPRESSION BRAKE SYSTEM FOR AN ENGINE

TECHNICAL FIELD

This disclosure generally relates to internal combustion engines and, more particularly, to operation of engine valves to facilitate engine braking or compression braking.

BACKGROUND

Compression brakes are well known devices in the industry used to provide additional stopping force especially in large vehicles. Internal combustion engines used on such vehicles typically have multiple cylinders, each of which defines a bore for receiving a piston. Each cylinder further includes one or more intake valves and one or more exhaust valves. During normal engine operation, the intake and exhaust valves are actuated at appropriate times to maximize the amount of force from fuel combustion that is delivered to an output, such as a crankshaft. A compression brake may alter the actuation of the intake and/or exhaust valves to dissipate the combustion force, thereby increasing engine drag to slow the vehicle. For example, in a standard four-cycle operation during a combustion stroke, an exhaust valve is generally in a closed position as a piston moves from near bottom dead center (BDC) to top dead center (TDC) and back to BDC. The force created by fuel combustion is therefore transferred to the crankshaft. During a compression brake operation during the combustion stroke, the exhaust valve generally opens as the piston moves from BDC to TDC and closes as the piston moves from TDC to BDC. Manipulating the valves in this manner dissipates any compression force during the upstroke, thereby dissipating the amount of force outputted to the crankshaft. Such systems are known in the art as compression release engine brakes.

A compression brake system is employed to actuate the intake and/or exhaust valves at the desired time, thereby to effect compression braking. The compression brake system typically includes a brake actuator, such as a brake actuator piston disposed in a brake actuator cylinder and mechanically coupled to the intake and/or exhaust valves. The actuator piston, in turn, may be hydraulically coupled to a master piston having a pin slidable between retracted and extended positions. A compression brake controller operatively coupled to the master piston may control flow of hydraulic fluid to the master piston, thereby to actuate the pin between the retracted and extended positions. A mechanical system may be used to couple the pin to a source of mechanical movement, such as a cam shaft.

The type of mechanical system used in the compression brake system may be influenced by the type of fuel injection system used by the vehicle engine. Some vehicles have mechanical unit injectors, for example, which use a mechanical force from a cam, such as the cam shaft, to actuate an injection valve. Engines using mechanical unit injectors typically include injector rocker arms to couple the cam to the mechanical unit injectors. The injector rocker arms pivot in response to rotation of the cam shaft, thereby to actuate the mechanical unit injector. In some of these systems, the injector rocker arm is configured to also engage the pin of the compression brake system. Accordingly, the same lobe of the cam shaft actuates both the mechanical unit injector and the compression brake system.

More recently, common rail systems have been used to inject fuel into the cylinders. The injector valves used in common rail systems are typically electronically actuated, and therefore do not require a mechanical source to actuate. Internal combustion engines having common rail systems, therefore, do not have injector rocker arms.

SUMMARY OF THE DISCLOSURE

A compression brake system for an internal combustion engine having an engine block and a camshaft rotatable relative to the engine block includes a brake actuator assembly having a brake actuator piston, a master cylinder having a volume of fluid, the volume of fluid having an deactivated state, in which the volume of fluid has a first fluid pressure, and an activated state, in which the volume of fluid has a second fluid pressure that is higher than the first fluid pressure, and a master piston slidably disposed in the master cylinder and operably coupled to the brake actuator piston. A mechanical system is disposed between the master piston and the camshaft, the mechanical system including a roller disposed in contact with the camshaft, the mechanical system being configured to maintain contact between the roller and the camshaft when the volume of fluid in the master cylinder is in the deactivated state.

An internal combustion engine includes an engine block, a camshaft rotatably coupled to the engine block, and a common rail fuel system. A compression brake system is provided having a brake actuator assembly that includes a brake actuator piston, a master cylinder having a volume of fluid, the volume of fluid having an deactivated state, in which the volume of fluid has a first fluid pressure, and an activated state, in which the volume of fluid has a second fluid pressure that is higher than the first fluid pressure, and a master piston slidably disposed in a master cylinder and operably coupled to the brake actuator piston. A mechanical system is disposed between the master piston and the camshaft, the mechanical system including a roller disposed in contact with the camshaft. The mechanical system is configured to maintain contact between the roller and the camshaft when the volume of fluid in the master cylinder is in the deactivated state.

A mechanical system for use in an internal combustion engine having an engine block and a camshaft supported for rotation relative to the engine block, the mechanical system coupling the camshaft to a compression brake system having a master piston movable between a retracted position and an extended position. The mechanical system includes a housing supported in a substantially fixed relation to the engine block, the housing defining an aperture. A lifter is slidably disposed in the aperture and has a first end facing the master piston and a second end coupled to the camshaft, the lifter being sized to couple with the master piston when the master piston is in the extended position. A resilient element is disposed between the housing and the lifter and configured to bias the lifter toward the camshaft.

DETAILED DESCRIPTION

Compression brake systems are disclosed herein that are configured for use with an internal combustion engine. The internal combustion engine may have a fuel injection system that does not include a moving valve train element to drive a master piston, such as a common rail system. The compression brake system may include a mechanical system having a stationary housing with a slidable lifter having a first end coupled to a cam shaft and a second end coupled to a pin of a master piston, thereby to actuate the compression brake system. Accordingly, the mechanical system of the compression brake does not employ a pivoting rocker arm. Additionally, the embodiments disclosed herein may be configured to use the existing cam shaft as the source of mechanical movement. Still further, the cam shaft lobe that is coupled to the lifter is dedicated for compression braking, and therefore its shape may be optimized for actuation of the compression brake.

Figure 1:
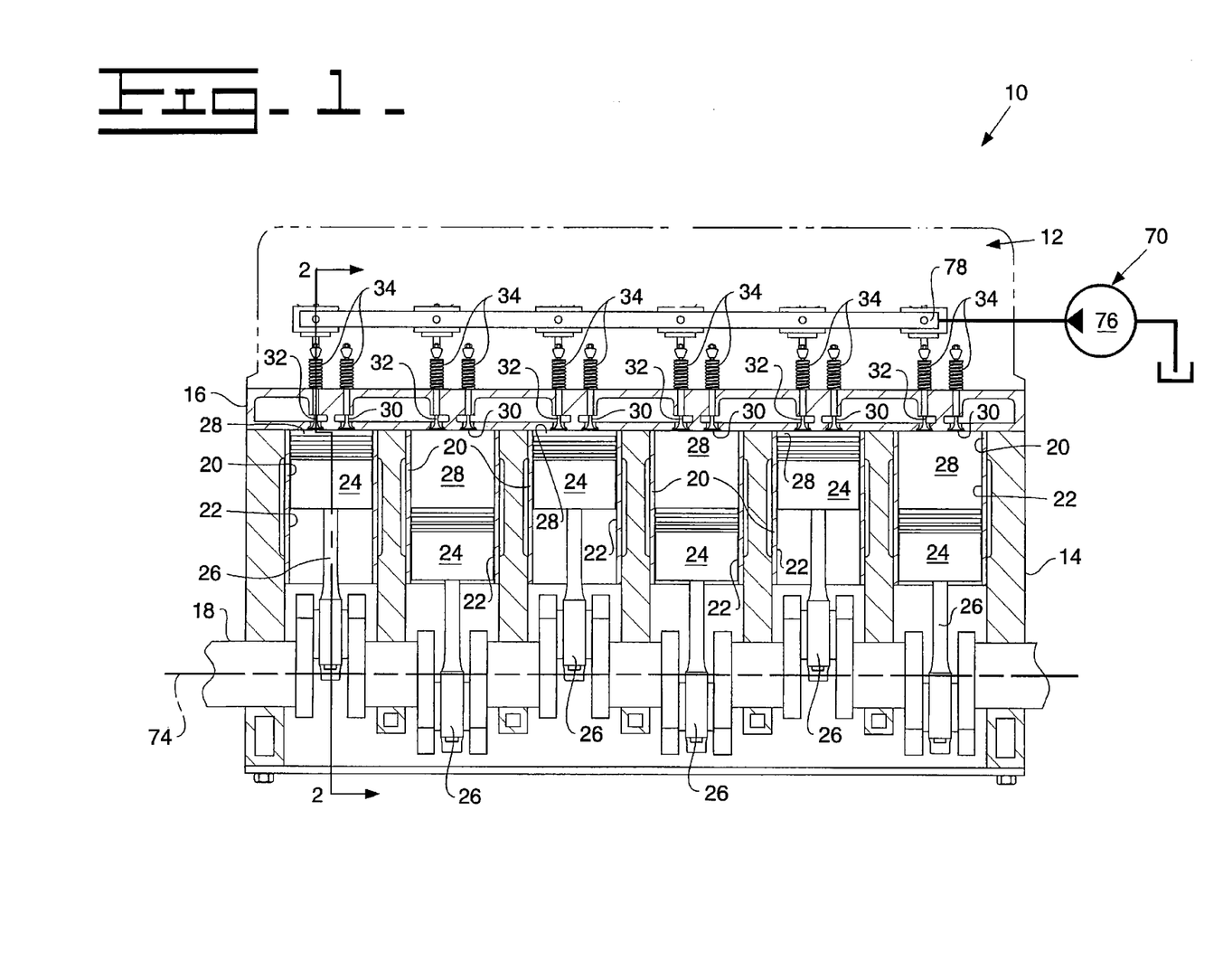
FIG. 1 is a diagrammatic longitudinal cross-section view of an embodiment of an internal combustion engine.
Figure 2:
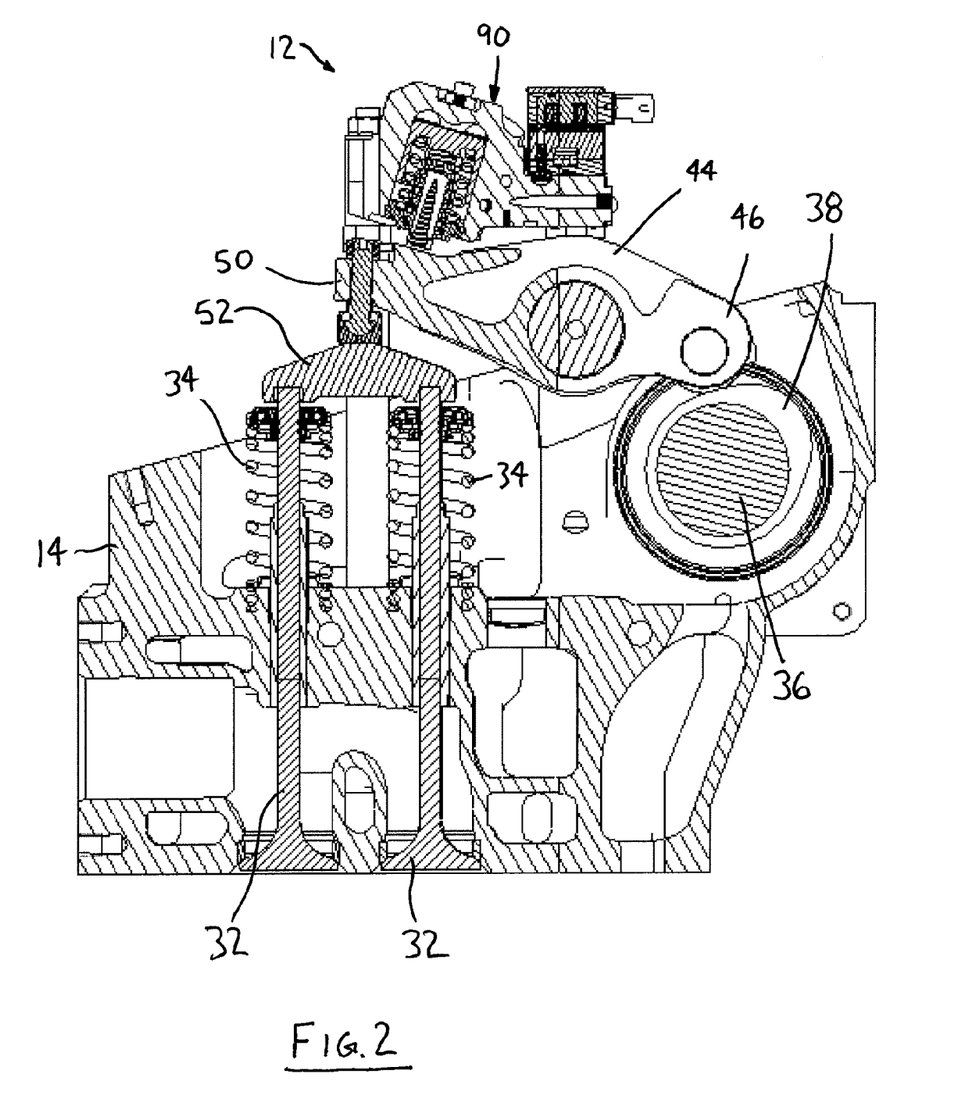
FIG. 2 is a diagrammatic cross-sectional view taken along line 2-2 of FIG. 1.

Referring to FIGS. 1 and 2, an internal combustion engine 10 is shown having a compression brake system. The internal combustion engine 10 has an engine block 14, a cylinder head 16 connected to the engine block 14 by a plurality of fasteners (not shown), and a crankshaft 18 rotatably connected to the engine block 14. A plurality of cylinders 20, each having a bore 22, are disposed in the engine block 14 and connected to the cylinder head 16 by way of the aforementioned cylinder block connection. A plurality of pistons 24 are slidably disposed in the bore 22 of the cylinders 20, one in each cylinder 20, and connected to the crankshaft 18 by a connecting rod 26. The cylinder head 16 and each cylinder bore 22 and associated piston 24 define a combustion chamber 28 therebetween. The pistons 24 are movable in the cylinder bores 22 between a top dead center position (TDC) adjacent the cylinder head 16 and a bottom dead center position (BDC) spaced from the top dead center position as determined by the crankshaft 18. As best shown in FIG. 1, the internal combustion engine 10 is a six cylinder four cycle in line engine having combustion, exhaust, intake, and compression strokes of the pistons 24. It is to be noted that internal combustion engines with a greater number of cylinders or a fewer number of cylinders are considered equivalents. It is also noted that the engine may operate in a two cycle mode.

Each cylinder 20 has a pair of intake valves 30 and a pair of exhaust valves 32. The intake and exhaust valves are 30, 32 are slidably connected to the cylinder head 16 and moveable between a closed position in which the valves 30, 32 are in seated engagement and have substantially zero lift with respect to the cylinder head 16 and an open position in which the valves 30, 32 are spaced a predetermined maximum desired lift distance from the seated position in the cylinder head 16. Each pair of intake and exhaust valves 30, 32 is positioned in an associated combustion chamber 28.

The intake and exhaust valves 30, 32 are biased to the closed position by a coil spring 34 and mechanically opened into the combustion chamber 28 during normal engine operation by mechanical coupling to a camshaft 36 rotatably connected to the engine block 14. As best shown in FIG. 2, the camshaft 36 includes a lobe 38. A cam follower 40 engages the cam lobe 38 and is connected to a valve rocker arm 44 by a push rod 42. The push rod 42 is connected to a first end 46 of the valve rocker arm 44. A second end 50 of the valve rocker arm 44 is coupled to a valve bridge 52. The valve bridge 52 is engageable with the pair of exhaust valves 32 and a similar valve bridge (not shown) is engageable with the pair of intake valves 30. As an alternative to the exemplary mechanical coupling illustrated in FIG. 2, the camshaft 36 may directly mechanically actuate the intake and exhaust valves 30, 32, directly engage the valve bridge 52, or directly engage the valve rocker arm 44. Additionally, each cylinder 20 may have single or multiple intake and exhaust valves 30, 32.

The camshaft 36 is operatively connected to forcibly move the intake and exhaust valves 30, 32 between the closed and open positions. The camshaft 36 determines the maximum amount of lift of each of the exhaust and intake valves 30, 32 at the open position. The exhaust valves 32 may be timed to normally be movable by the camshaft 36 to the open position during movement of the respective piston 24 within a first predetermined range of piston movement and the intake valves 30 are timed to normally be movable by the camshaft 36 to the open position during movement of the piston 24 within a second predetermined range of piston movement.

The internal combustion engine 10 may include a fuel system that does not include a moving valve train element that can be used to drive a master piston. In the illustrated, exemplary embodiment, the fuel system includes a common rail 78, however the subject matter claimed herein may be used with fuel systems that do not include a common rail. A source of pressurized fluid 70 may be provided to the common rail 78 using a variable delivery pump 76. The variable delivery pump 76 may deliver high pressure fluid, in the vicinity of 3000 psi, to the common rail 78. The high pressure fluid provides the energy to actuate fuel injectors (not shown) associated with the cylinders 20.

Figure 3:
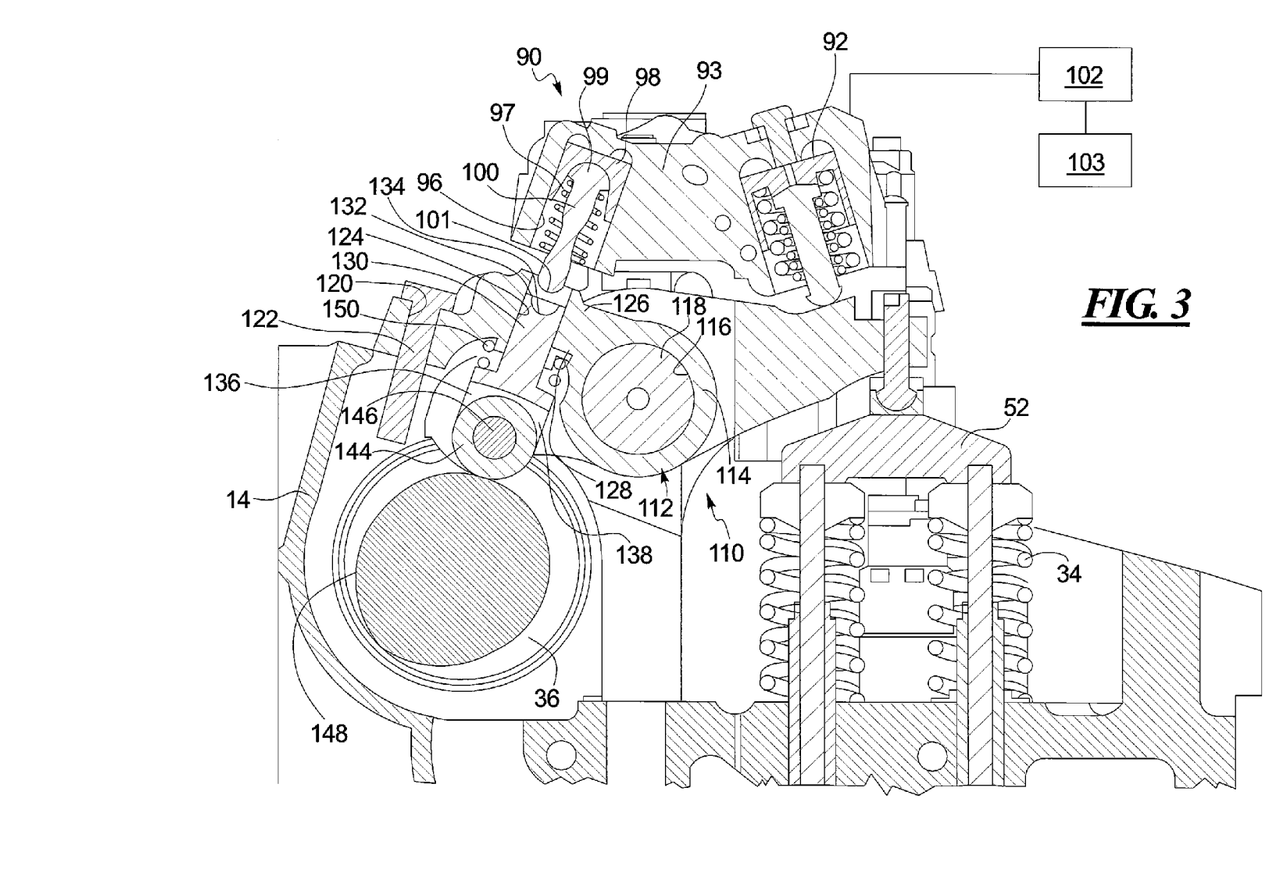
FIG. 3 is a diagrammatic cross-sectional view of the engine of FIG. 1, showing the details of a compression brake system having a mechanical system for coupling a compression brake system to a camshaft.

A first embodiment of a compression brake system 12 is illustrated in FIG. 3. The system 12 includes a brake actuator assembly 90 which may be provided as any known assembly used to actuate a cylinder valve to effect an engine brake. For exemplary purposes, the illustrated brake actuator assembly 90 includes a brake actuator piston 92 slidably disposed in a brake actuator cylinder 94. The brake actuator piston 92 is coupled to at least one of the cylinder valves, such as the exhaust valves 32. In the exemplary embodiment, the brake actuator piston 92 is attached to the valve bridge 52, however the brake actuator piston may be directly coupled to the exhaust valves 32. The brake actuator cylinder 94 is operatively coupled, such as hydraulically coupled, to a master cylinder 96. A master piston 98 is slidably disposed in the master cylinder 96 and a pin 100 is coupled to the master piston 98. The pin 100 includes a first end 99 coupled to the master piston 98 and a second end 101 projecting downwardly from the master cylinder 96. The master piston 98 is movable between a retracted position, as shown in FIG. 3, and an extended position in which the master piston 98 drives the second end 101 of the pin 100 to project farther outwardly from the master cylinder 96.

The master cylinder 96 fluidly communicates with a source of pressurized fluid, such as the oil lubrication system of the engine. A compression brake controller 102 is operatively coupled to the brake actuator assembly 90 to selectively permit fluid communication between the pressurized fluid source and the master cylinder 96, thereby to drive the master piston 98 to the extended position. In the exemplary embodiment, a piston spring 97 biases the master piston 98 toward the retracted position during normal operation of the engine. During normal engine operation, the brake actuation system is off so that a volume of fluid in the master cylinder 96 is in a deactivated state, where the fluid has a low pressure or is unpressurized. When the brake actuation system is on, the master piston 98 may be driven to the extended position by pressurizing the fluid in the master cylinder 96 to produce a hydraulic force on the master piston 98 which overcomes the spring bias force, thereby to effect compression braking.

More specifically, the compression brake system 12 may include a sensor 103 configured to sense an engine parameter and deliver a position signal related to a position of the piston 24. The controller 102 is operably coupled to the sensor 103. The controller 102 may be a microprocessor based or discrete hard wired component which is adapted to receive the position signal and deliver a responsive actuation control signal.

The sensor 103 may be adapted to sense the angular position of the crankshaft 18 as the crankshaft 18 rotates about its longitudinal axis 74 in the engine block 14. Since the crankshaft 18 is pivotally connected to the pistons 24, the angular position of the crankshaft 18 provides position information for each piston 24. It should be noted that sensor 103 may include one or more sensors and may sense other engine parameters, such as engine speed, cylinder pressure, and piston position, for example.

The compression brake system 12 further includes a mechanical system 110 for transmitting mechanical movement from a mechanical movement source to the pin 100 of the brake actuator assembly 90 when the master piston 98 is in the extended position. In the exemplary embodiment, the mechanical system 110 includes a housing 112 that is supported in fixed relation to the engine block 14, and therefore does not rotate. The housing 112 may have a cylindrical end 114 having an inner wall 116 sized to closely fit a support shaft 118 fixed to the engine block 14. A bolt hole 120 is formed at an opposite end of the housing 112 and is sized to receive a bolt 122. The bolt 122 may be threadably received by internal threads formed in the engine block 14. The housing 112, with both ends supported in fixed relation to the engine block 14, therefore does not rotate. An aperture 124 extends through a body 126 of the housing 112. A shoulder 128 is formed by a lower surface of the housing 112 bordering the aperture 124.

The mechanical system 110 further includes a lifter 130 sized to be slidably received in the aperture 124 of the housing 112. The lifter 130 includes a first end 132 facing toward the pin 100 of the brake actuator assembly 90. The first end 132 may be configured to have a shape that is complementary to the shape of the pin 100. In the illustrated embodiment, a recess 134 is formed in the first end 132 and is shaped to closely fit the second end 101 of the pin 100.

The lifter 130 further includes a second end 136 configured to engage the source of mechanical movement, such as the camshaft 36. In the illustrated embodiment, the second end 136 is formed as a split yoke having two arms 138 (only one arm is shown in FIG. 3). An axle 146 extends between the two arms 138 and a roller 144 is supported for rotation about the axle 146. The roller 144 is positioned to engage the camshaft 36. While the exemplary embodiment includes the roller 144, other embodiments may use other means to engage the camshaft 36, such as a sliding contact cam follower.

Returning to the illustrated embodiment, the roller 144 may rotatably engage a brake lobe 148 of the camshaft 36. A resilient member, such as a spring 150, is disposed between the housing 112 and the lifter 130 to bias the lifter 130 into engagement with the roller 144. In the exemplary embodiment, the spring 150 is disposed between the shoulder 128 of the housing 112 and the lifter second end 136. Accordingly, movement of the roller 144 in response to rotation of the brake lobe 148 is translated to the lifter 130, so that it slidably reciprocates within the aperture 124.

In operation, when compression braking is not needed, the compression brake system 12 is in an off position in which the master piston 98 is in the retracted position so that the second end 101 of the pin 100 is spaced from the first end 132 the lifter 130. As a result, the motion of the lifter 130 as it reciprocates in response to rotation of the camshaft 36 is not mechanically transferred to the brake actuator assembly 90, and the intake and exhaust valves 30, 32 are actuated in a normal manner.

When the controller 102 sends the compression braking signal, the master piston 98 is actuated to the extended position so that the pin 100 engages the lifter 130. With the pin 100 in this position, the reciprocating motion of the lifter 130 is transferred to the brake actuator assembly 90 to override the normal operation of at least one of the intake and exhaust valves 30, 32. Because the brake lobe 148 is dedicated to compression braking (and is not needed to serve the dual function of compression braking and actuation of a mechanical unit injector), the shape of the brake lobe 148 may be configured for optimal compression braking. Alternatively, the brake lobe 148 may be configured to execute alternative braking schemes, such as constant or near-constant lift braking.

Figure 4:
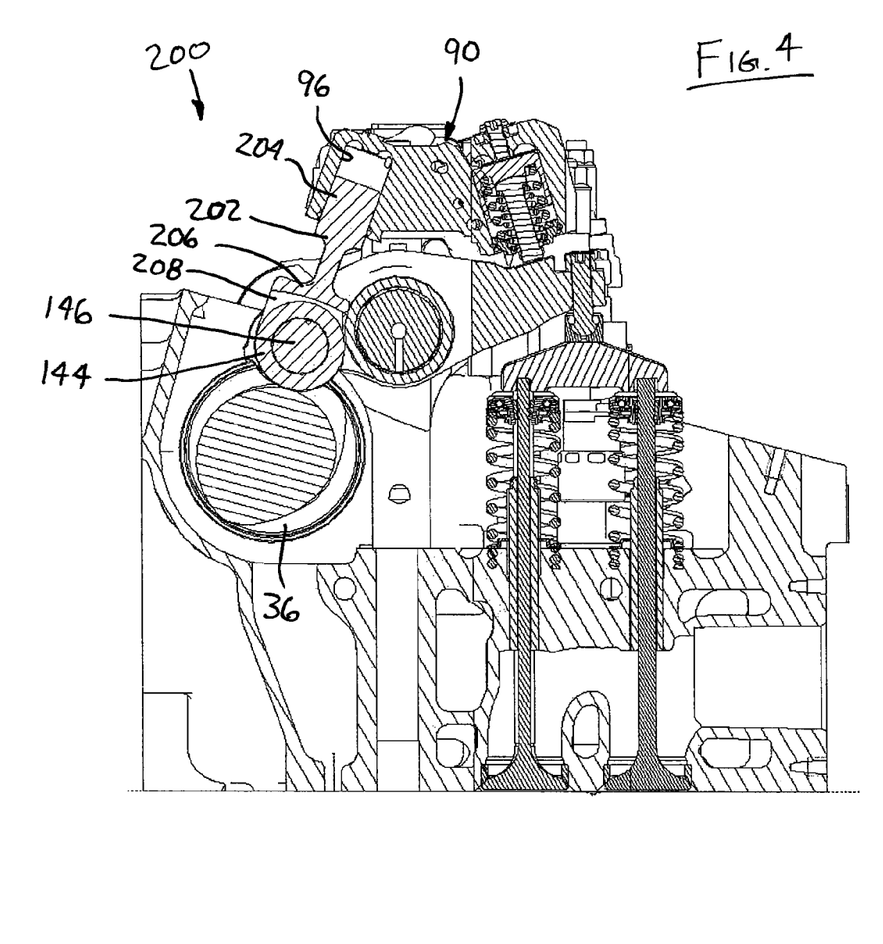
FIG. 4 is a diagrammatic cross-sectional view of an alternative embodiment of a compression brake system having an extended master piston.

A second embodiment of a compression brake system 200 eliminates the separate mechanical system and instead uses an extended master piston 202 to mechanically engage the camshaft 36. As best shown in FIG. 4, the extended master piston 202 includes a first end or piston body 204 slidably disposed within the master cylinder 96. The extended master piston 202 further includes a second end 206 extending out of the master cylinder 96 and having a pair of extension arms 208 (only one arm 208 is shown in FIG. 4). The axle 146 is coupled to the extension arms 208 and carries the roller 144. The force of gravity on the extended master piston 202 holds the roller 144 in contact with the brake lobe 148. When the brake actuator assembly 90 is off, the extended master piston 202 is permitted to slide freely within the master cylinder 96, and therefore the reciprocating movement of the extended master piston 202 is not transferred to the brake actuator housing. When the brake actuator assembly 90 is activated, fluid pressure in the master cylinder 96 is increased so that movement of the extended master piston 202 is transferred to the brake actuator assembly 90.

Figure 5:
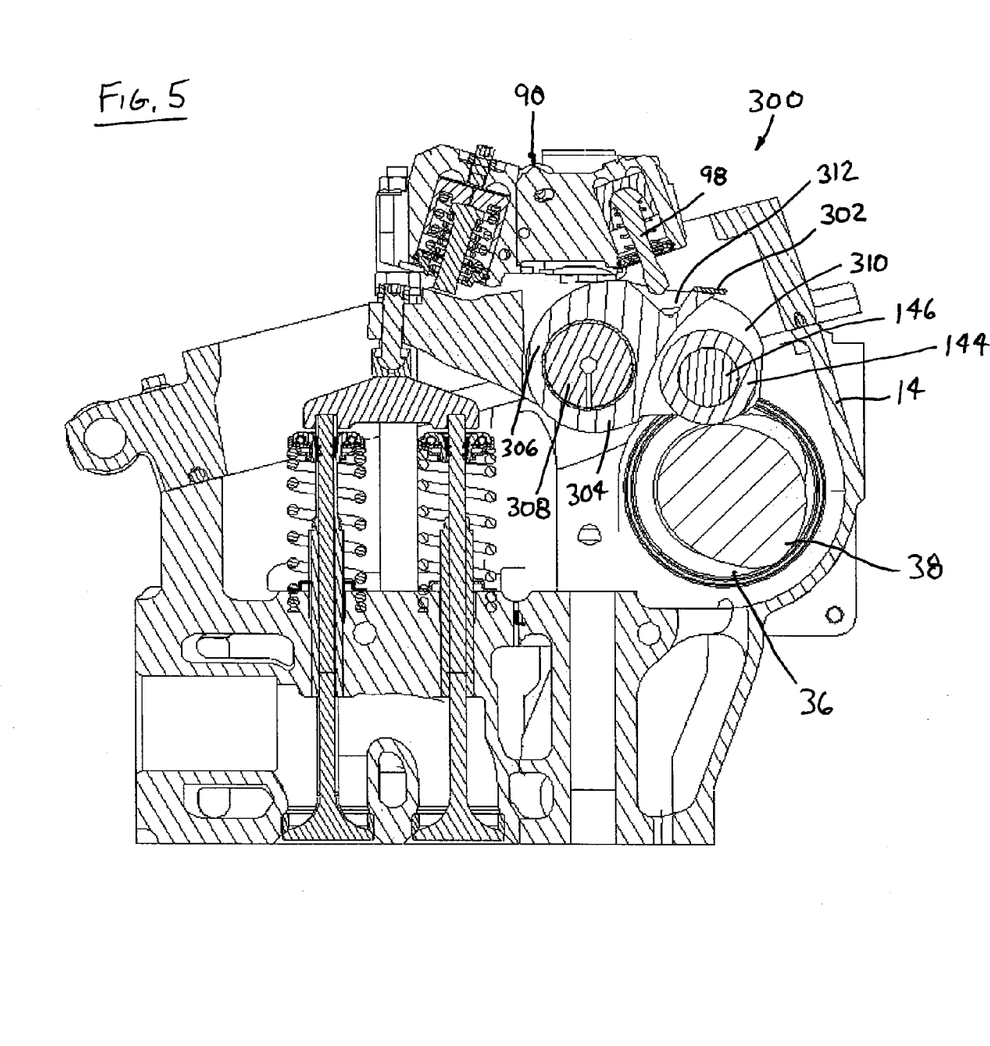
FIG. 5 is a diagrammatic cross-sectional view of another alternative embodiment of a compression brake system having a cantilevered beam spring.

A third embodiment of a compression brake system 300 is illustrated in FIG. 5. The compression brake system 300 uses a cantilevered beam spring 302 to maintain a rocker arm 304 in engagement with the camshaft 36. The beam spring 302 may have a base end coupled to the engine block 14, such as by attachment to a valve cover base. A free end of the beam spring 302 engages the rocker arm 304. The rocker arm 304 may have a first end 306 pivotably coupled to the engine block by a support shaft 308 and a second end 310 having the axle 146 carrying the roller 144. The rocker arm 304 may further include a contact point, such as a depression 312, configured to engage the master piston 98 in the extended position. The beam spring 302 engages the rocker arm 304 to bias the second end 310 toward the camshaft 36, thereby maintaining the roller 144 in contact with the brake lobe 148. The master piston 98 is movable to an extended position as described in the above embodiments to engage the depression 312, thereby to transfer the movement of the brake lobe 148 to the brake actuator assembly 90.

Figure 6:
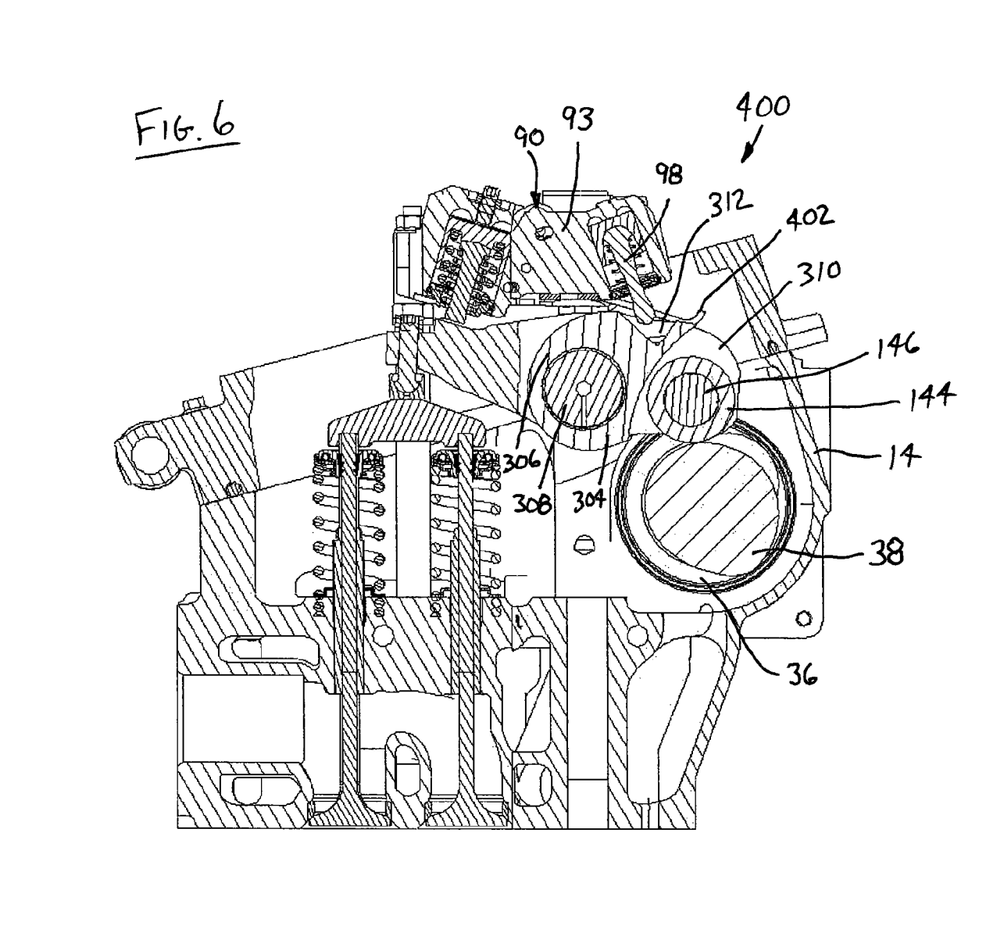
FIG. 6 is a diagrammatic cross-sectional view of yet another embodiment of a compression brake system having a forked spring.

A fourth embodiment of a compression brake system 400 is illustrated in FIG. 6 and uses the rocker arm 304 of the previous embodiment. The compression brake system 400 includes a forked spring 402 to maintain the rocker arm 304 in engagement with the camshaft 36, similar to the embodiment of FIG. 5. The forked spring 402 includes a base end coupled to a bottom of a brake actuator assembly housing 93. Free ends of the forked spring 402 engage the rocker arm 304. The forked spring 402 engages the rocker arm 304 to bias the second end 310 toward the camshaft, thereby engaging the roller 144 with the brake lobe 148. The master piston 98 is again movable to an extended position to transfer movement of the brake lobe 148 to the brake actuator assembly 90.

Industrial Applicability

The compression brake systems described herein may use an existing camshaft to provide the mechanical movement for actuating a brake actuator assembly. The systems may fit in the space normally provided for injector rocker arms, and therefore do not change the overall external engine packaging requirements.

It will be apparent to those skilled in the art that various modifications and variations can be made in the disclosed compression braking systems without departing from the scope of the disclosure. Other embodiments of the disclosed systems and methods will be apparent to those skilled in the art from consideration of the specification and practice of the transmission disclosed herein. It is intended that the specification and examples be considered as exemplary only, with a true scope of the disclosure being indicated by the following claims and their equivalents.

What is claimed is:

1. A compression brake system for an internal combustion engine having an engine block and a camshaft rotatable relative to the engine block, the compression brake system comprising:
   a cam follower assembly including a cam follower body having a first end supporting a roller disposed in contact with the camshaft and a second end defining contact point oriented away from the camshaft; and
   a brake actuator assembly having:
      a brake actuator piston;
      a master cylinder having a volume of fluid, the volume of fluid having a deactivated state, in which the volume of fluid has a first fluid pressure, and an activated state, in which the volume of fluid has a second fluid pressure that is higher than the first fluid pressure;
      a master piston slidably disposed in the master cylinder and hydraulically coupled to the brake actuator piston; and
      a master pin having a first end coupled to the master piston and a second end opposite the first end;
      the master piston moving to a retracted position when the master cylinder is in the deactivated state, in which the second end of the master pin is spaced from the contact point, and the master piston moving to an extended position when the master cylinder is in the activated state, in which the second end of the master pin mechanically engages the contact point, wherein the master piston is biased in the retracted position.

2. The compression brake system of claim 1, in which:
   the cam follower assembly includes a housing supported in a substantially fixed relation to the engine block, the housing defining an aperture;
   the cam follower body comprises a lifter slidably disposed in the aperture and defining a shoulder; and
   a resilient element is disposed between the housing and the shoulder and configured to bias the lifter toward the camshaft.

3. The compression brake system of claim 2, in which the resilient element comprises a spring.

4. The compression brake system of claim 2, in which the contact point is formed with a recess shaped to complement the second end of the master pin.

5. The compression brake system of claim 1, in which the cam follower body comprises a rocker arm pivotably coupled to the engine block.

6. The compression brake system of claim 5 further comprising a cantilevered beam spring having a base end coupled to the engine block and a free end engaging the rocker arm, the cantilevered beam spring configured to bias an end of the rocker arm carrying the roller toward the camshaft.

7. The compression brake system of claim 5, further comprising a forked spring having a base end coupled to a brake actuator assembly housing and a free end engaging the rocker arm, the forked spring configured to bias and end of the rocker arm carrying the roller toward the camshaft.

8. An internal combustion engine, comprising:
   an engine block;
   a camshaft rotatably coupled to the engine block;
   a common rail fuel system;
   a compression brake system comprising:
      a cam follower assembly including a cam follower body having a first end supporting a roller disposed in contact with the camshaft and a second end defining contact point oriented away from the camshaft; and
      a brake actuator assembly having:
         a brake actuator piston;
         a master cylinder having a volume of fluid, the volume of fluid having a deactivated state, in which the volume of fluid has a first fluid pressure, and an activated state, in which the volume of fluid has a second fluid pressure that is higher than the first fluid pressure;
         a master piston slidably disposed in the master cylinder and hydraulically coupled to the brake actuator piston; and
         a master pin having a first end coupled to the master piston and a second end opposite the first end;
         the master piston moving to a retracted position when the master cylinder is in the deactivated state, in which the second end of the master pin is spaced from the contact point and the master piston moving to an extended position when the master cylinder is in the activated state, in which the second end of the master pin mechanically engages the contact point, wherein the master piston is biased in the retracted position.

9. The internal combustion engine of claim 8, in which:
   the cam follower assembly includes a housing supported in a substantially fixed relation to the engine block, the housing defining an aperture;
   a lifter slidably disposed in the aperture and defining a shoulder; and
   a resilient element is disposed between the housing and the shoulder and configured to bias the lifter toward the camshaft.

10. The internal combustion engine of claim 9, in which the contact point is formed with a recess shaped to complement the second end of the master pin.

11. The internal combustion engine of claim 8, in which the cam follower body comprises a rocker arm pivotably coupled to the engine block.

12. The internal combustion engine of claim 11, further comprising a cantilevered beam spring having a base end coupled to the engine block and a free end engaging the rocker arm, the cantilevered beam spring configured to bias an end of the rocker arm carrying the roller toward the camshaft.

13. The internal combustion engine of claim 11, further comprising a forked spring having a base end coupled to a brake actuator assembly housing and a free end engaging the rocker arm, the forked spring configured to bias and end of the rocker arm carrying the roller toward the camshaft.

14. A compression brake system for an internal combustion engine having an engine block and a camshaft supported for rotation relative to the engine block, the compression brake system comprising:
- a cam follower assembly including:
  - a housing supported in a substantially fixed relation to the engine block, the housing defining an aperture;
  - a lifter slidably disposed in the aperture and having a lifter first end facing the master piston and defining a contact point and a lifter second end;
  - a roller coupled to the lifter second end and disposed in contact with the camshaft; and
  - a resilient element disposed between the housing and the lifter and configured to bias the lifter toward the camshaft; and
- a brake actuator assembly having:
  - a brake actuator piston;
  - a master cylinder having a volume of fluid, the volume of fluid having a deactivated state, in which the volume of fluid has a first fluid pressure, and an activated state, in which the volume of fluid has a second fluid pressure that is higher than the first fluid pressure; and
  - a master piston slidably disposed in the master cylinder and hydraulically coupled to the brake actuator piston; and
  - a master pin having a first end coupled to the master piston and a second end opposite the first end;
  - the master piston moving to a retracted position when the master cylinder is in the deactivated state, in which the second end of the master pin is spaced from the contact point, and the master piston moving to an extended position when the master cylinder is in the activated state, in which the second end of the master pin mechanically engages the contact point, wherein the master piston is biased in the retracted position.

* * * * *

UNITED STATES PATENT AND TRADEMARK OFFICE
CERTIFICATE OF CORRECTION

PATENT NO. : 8,800,531 B2  Page 1 of 1
APPLICATION NO. : 12/722617
DATED : August 12, 2014
INVENTOR(S) : Wiley et al.

It is certified that error appears in the above-identified patent and that said Letters Patent is hereby corrected as shown below:

In the specification

Column 7, line 11, delete "Industrial Applicability" and insert -- INDUSTRIAL APPLICABILITY --.

In the claims

Column 8, line 7, in Claim 6, delete "claim 5" and insert -- claim 5, --.

Column 8, line 44, in Claim 8, delete "point" and insert -- point, --.

Signed and Sealed this
Sixth Day of October, 2015

Michelle K. Lee
*Director of the United States Patent and Trademark Office*